Sept. 7, 1965 R. E. HANSEN 3,204,703
SOIL CULTIVATOR APPARATUS
Filed March 19, 1964 4 Sheets-Sheet 1

INVENTOR.
ROYAL E. HANSEN
BY
ATTORNEY

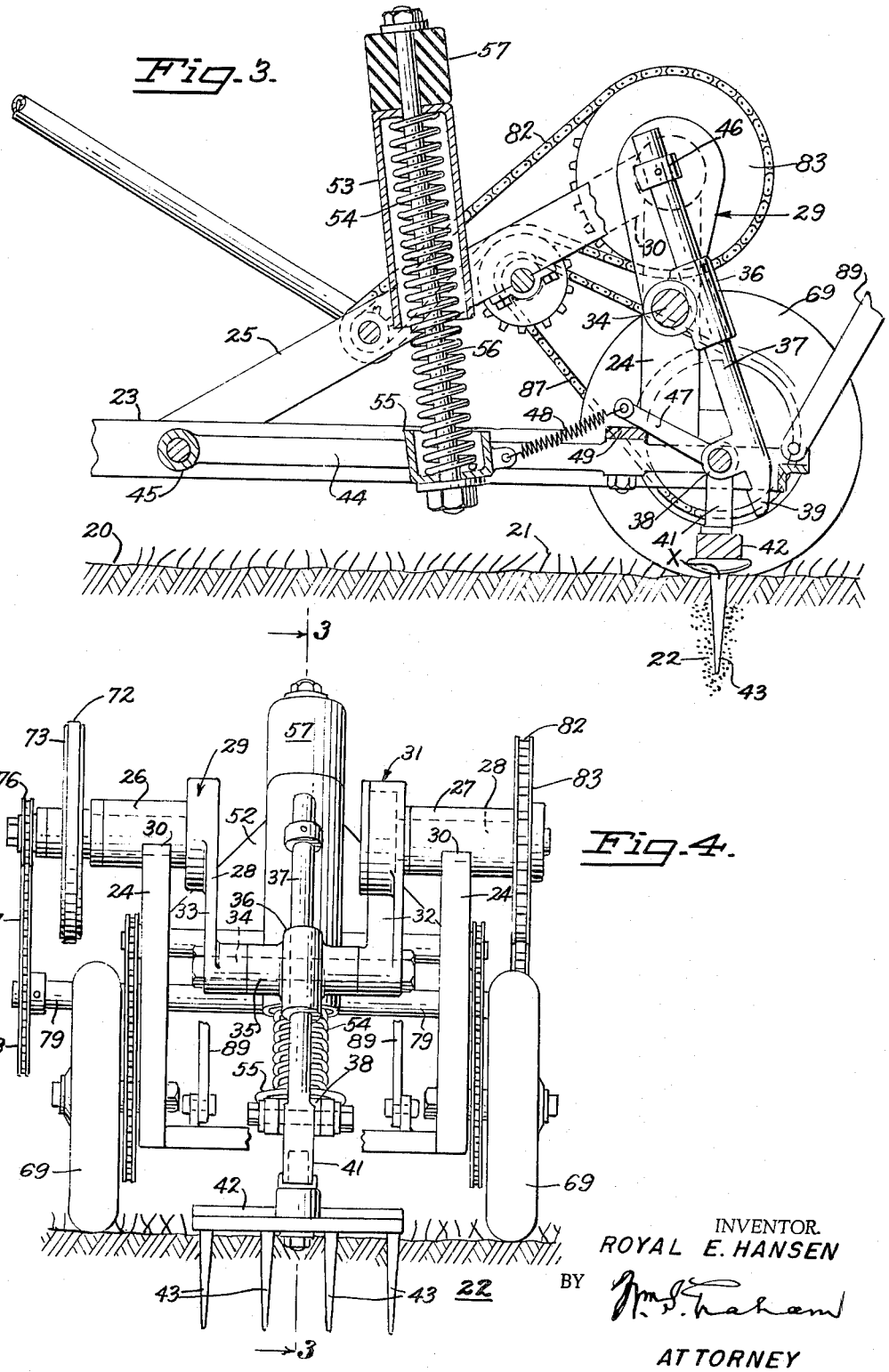

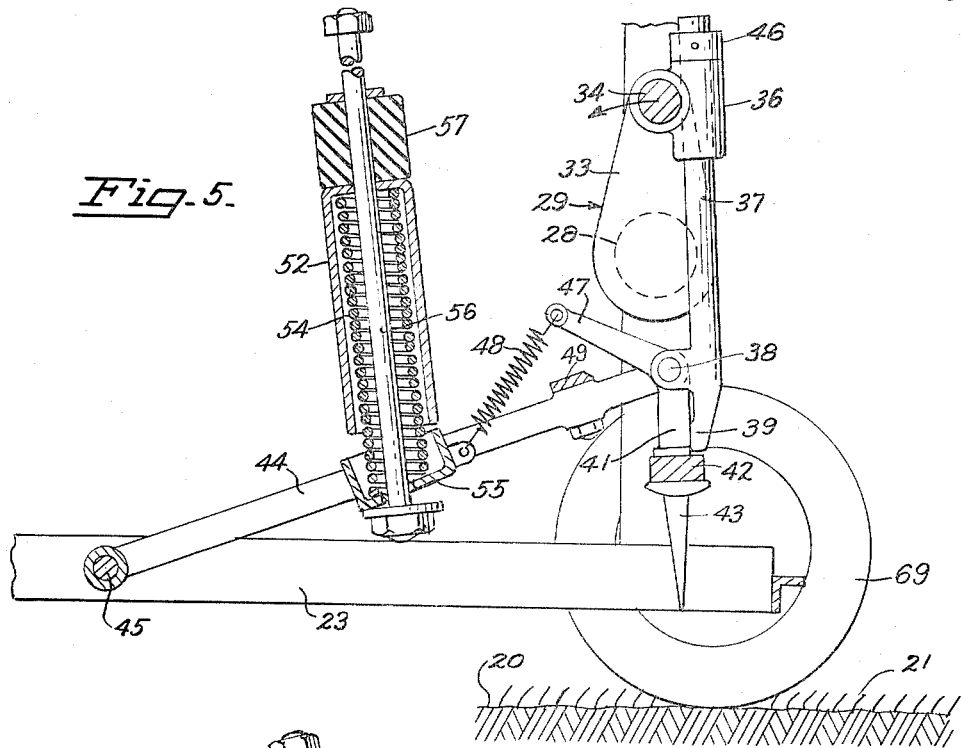
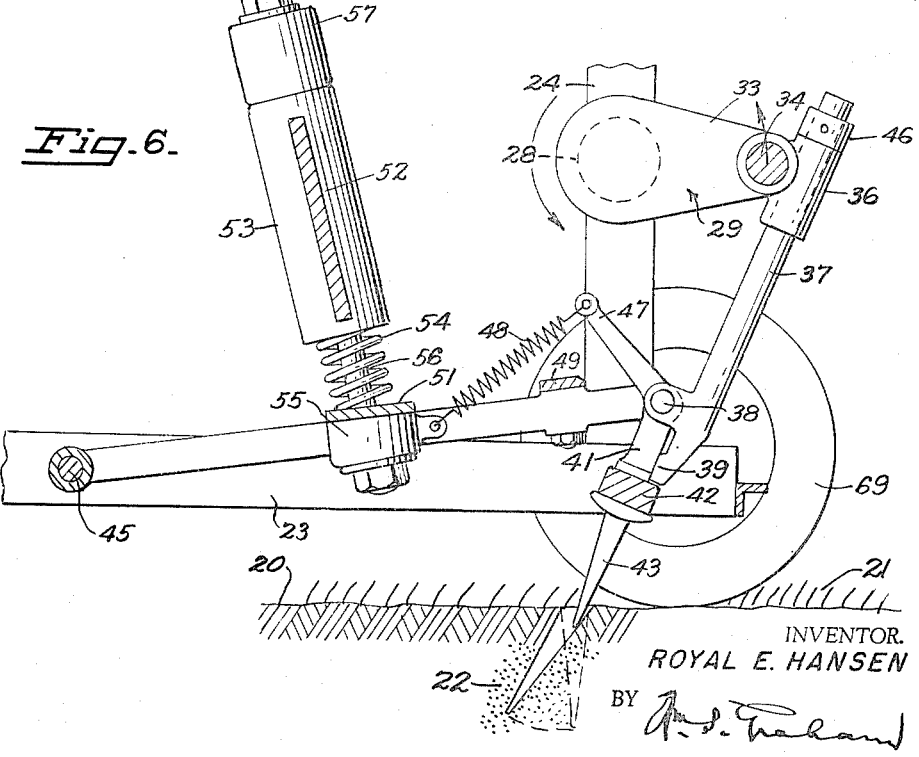

Sept. 7, 1965  R. E. HANSEN  3,204,703
SOIL CULTIVATOR APPARATUS
Filed March 19, 1964  4 Sheets-Sheet 4
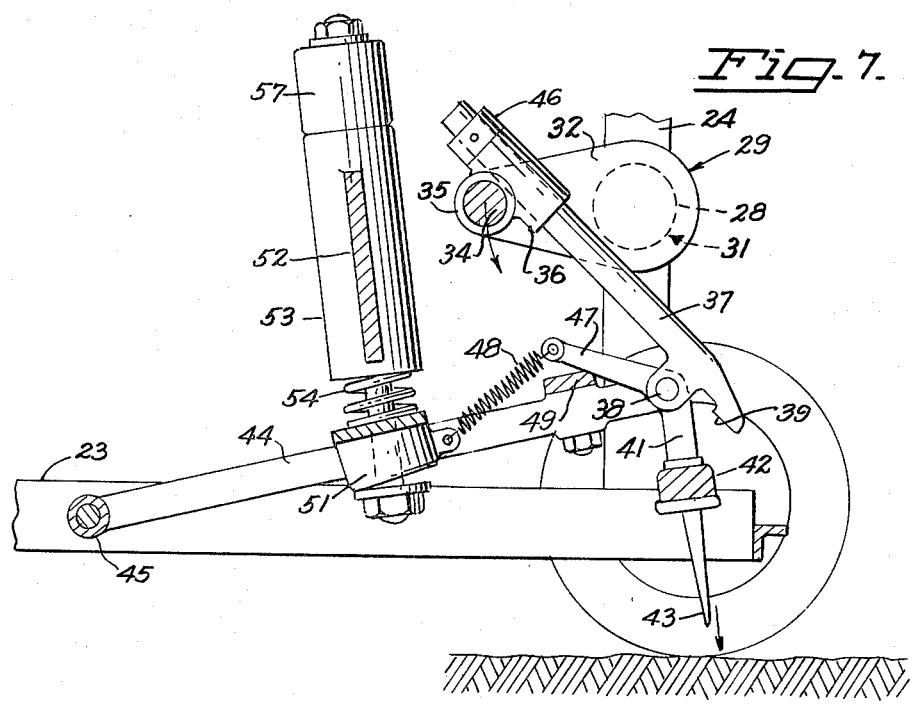
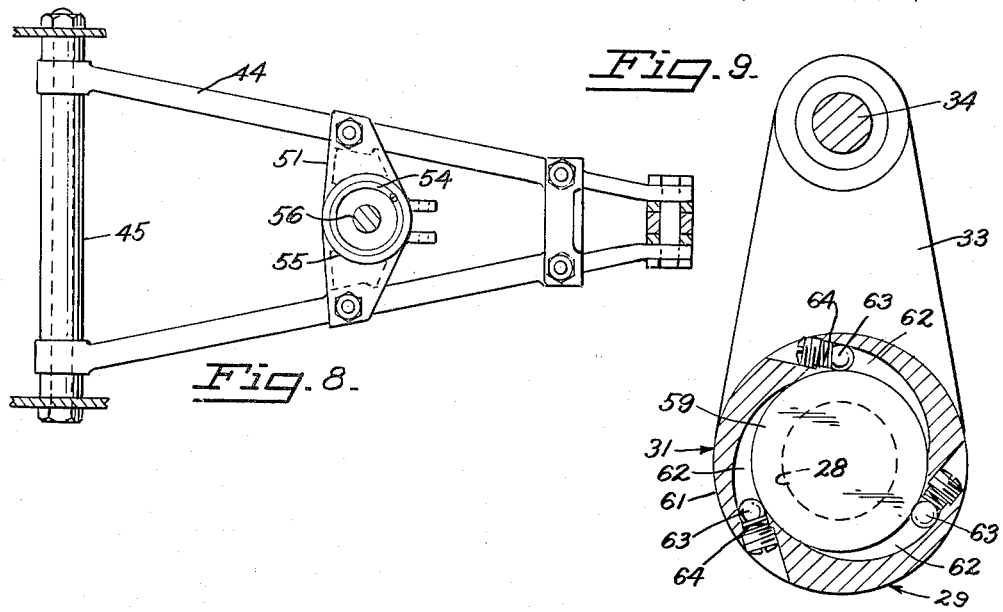
INVENTOR.
ROYAL E. HANSEN
BY
ATTORNEY

United States Patent Office 3,204,703
Patented Sept. 7, 1965

3,204,703
SOIL CULTIVATOR APPARATUS
Royal E. Hansen, Healdsburg, Calif.
(361 Sand Mound Blvd., Rte. 2, Oakley, Calif.)
Filed Mar. 19, 1964, Ser. No. 353,139
10 Claims. (Cl. 172—21)

This invention relates to soil cultivating devices, and relates more particularly to soil loosening devices which cultivate and break up the subsurface soil while maintaining the surface layer of soil penetrated but not greatly disturbed.

In large areas of the country, more particularly in areas where there is relatively little moisture from rainfall during extended portions of the year, and especially in those areas where the ground is characterized by so-called "hard pan" or "adobe" soil which hardens when dry it is well known that it is difficult to maintain such soil cultivated, arable and irrigated sufficiently to maintain a good growth of vegetation, such as a cover crop, and particularly grass lawns.

It is an object of the invention to provide a soil loosening and cultivating device which is portable to move over the soil surface of an area and loosen the subsurface soil without unduly disturbing the soil at the surface or sufficiently closely adjacent thereto to substantially damage the roots o fa growing cover such as grass.

More specifically, it is an object of the invention to provide a portable machine which may be moved as a vehicle over an area of ground, and provide in such portable device a pronged fork which is thrust into the soil, and means for manipulating the free end portion of the prongs laterally in the soil beneath the ground surface while maintaining the base or mounted portion of the prongs substantially at the position of entering into the ground until the prongs are pulled out of the ground, whereby the soil below the ground surface is rendered relatively loose, cultivated and friable and the holes of penetration by the prongs in the exposed surface of the soil are not proportionately enlarged, and the superficial surface layer of soil which may have a growth of grass, is not greatly disturbed.

Briefly described, a portable supporting frame is provided with suitably driven vehicular wheels, and a drive means which may propel the soil loosener apparatus as well as operate its other mechanisms, including a rotatatively driven crank which has a shaft bearing on the frame. This rotative crank shaft bearing of the frame is free running at one end of the crank shaft and at the opposite end of the crank shaft is rotatively mounted in a slip-and-grip free-wheeling clutch which engages and rotates the crank and crank pin in one direction up to a certain predetermined point and simultaneously raises one end of a spring-compressing A-shaped frame which is pivotally hinged at one end and has an opposite end which swings or oscillates on said hinge. Said latter oscillating end of the A-frame is connected by a vertical pitman shaft to the crank pin of the crank shaft. The raising of the oscillating end of the A-frame compresses a coil spring. Said free end of the A-frame mounts a pronged fork. When rotation of the crank shaft by the free-wheeling clutch reaches a specified point of rotation which is also the stage of maximum compression of said coil spring, the free wheeling clutch releases the crank shaft whereupon the crank pin then drops precipitately to its lowest point, which suddenly releases the compression of the spring, whereupon the spring expands with great force against the A-frame, and the expanding of the spring drives the prongs of the fork into the ground. At this time the binding clutch members of the free-wheeling clutch again bind the crank shaft engaged thereby and rotates the crank pin toward an upward position which thereby pivotally rocks an extended end of the said pitman shaft against the fork and thereby presses upon said shank of the fork to urge the prongs or tines rearwardly. Such urging of the tines rearwardly breaks up the soil beneath the surface of the ground. The continued rotation of the crank lifts the tines out of the ground and again compresses the spring for a repeat operation. But, while this operation has been in progress the machine has been moving forward responsive to its drive means so that the prongs or tines are inclined rearwardly from their base to the free sharp ends so that when the tines are pulled out of the ground they are pulled at an angle inclined rearwardly. The prongs are not pulled directly upwardly which would disrupt the surface soil and make a large hole. Instead, with the forward movement of the machine, the tines are pulled out of the ground at substantially the same angle to which they have been tilted rearwardly so that they are pulled out of the ground through the same holes where they penetrated the ground without further tearing of the surface soil or the bed of grass thereon.

With the foregoing objects in view, a more detailed description of the invention is set forth in the specification herein and illustrated in the accompanying drawing, in which:

FIG. 3 is an enlarged longitudinal fragmentary central section on line 3—3 of FIG. 4.

FIG. 4 is a front elevation of FIG. 3.

FIG. 5 is fragmentary side sectional view showing actuating spring in compressed position and prongs of fork ready to be projected into ground.

FIG. 6 is a fragmentary side sectional view showing a progressively advanced position of mechanism with prongs of fork pushed rearwardly and being withdrawn from ground after loosening the soil.

FIG. 7 is a fragmentary side sectional view with crank advanced 45 degrees beyond the position shown in FIG. 5.

FIG. 8 is a plan view of a triangular A-frame.

FIG. 9 is a fragmentary view partly in section of an overrunning free-wheeling clutch.

Figure 1:
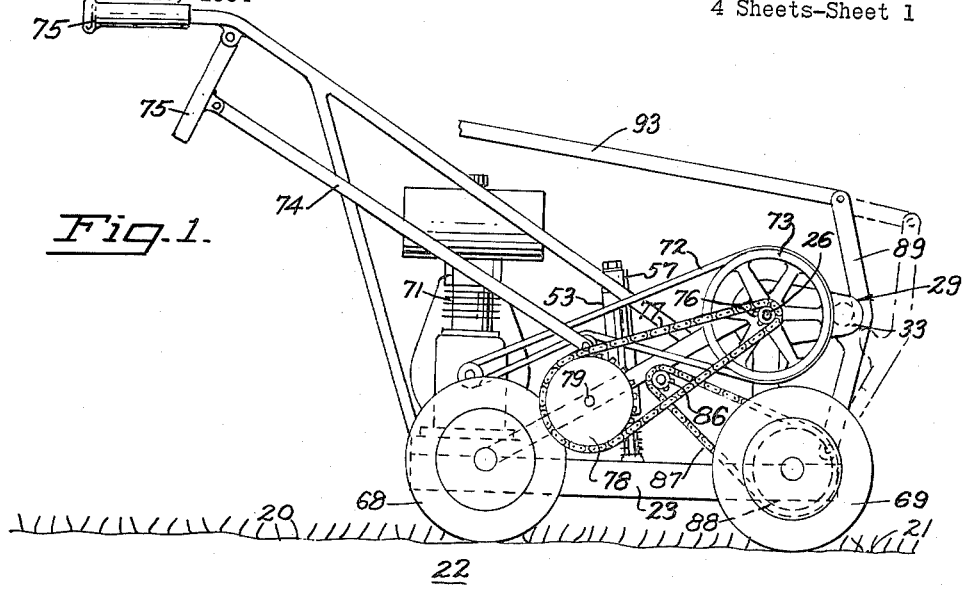
FIG. 1 is a side elevation of the device of the invention with the forward end at the right hand side of the sheet.
Figure 2:
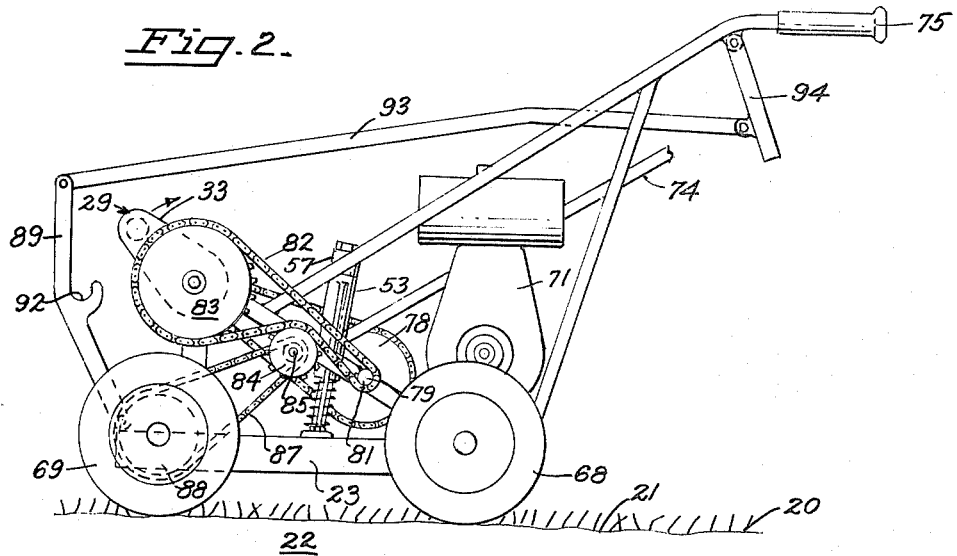
FIG. 2 is a side elevation looking from the opposite side of FIG. 1.

Referring to the drawings in which like reference characters indicate corresponding parts in the several views, 20 indicates the level of the ground upon which the device of the application may operate, having a surface layer 21 which may be a bed of grass, and a subsoil layer 22 which may be so-called hardpan or adobe which becomes very hard when dry so that water of irrigation will not penetrate it, the present invention being to provide means to break up the hard subsoil so that it may be penetrated by roots of vegetation and by water of irrigation or by fertilizer.

The device of the soil loosener of the invention comprises a pair of relatively parallel spaced upright frames, each having a base beam 23, a substantially upright beam 24, and an inclined beam 25 connecting the appropriate end portions of the beams 23, 24, to provide a pair of generally triangular parallel spaced frames each having an angle 30 disposed upwardly.

In this upper angle 30 of each of the spaced frames is a bearing separately indicated 26 and 27, each of which is a rotative bearing for one of the opposite ends of a crank shaft 28 of a crank 29. The end of the crank shaft 28 in bearing 26 is mounted for free rotation, whereas the end of said crank shaft mounted in bearing 27 is provided with any kind of a slip-and-grip means exemplified herein as a clutch 31 which, and from its function, may be termed a free-wheeling clutch. The crank 29 is provided with the usual hanger webs 32, 33 which mount between their cooperating outer ends a crank pin 34 which, as usual, revolves around the axis of the crank shaft 28.

The crank pin 34, revolving as it does about the axis of crank shaft 28, has rotatively mounted at its longitudinal central portion a cylindrically bored first bearing sleeve 35 which manifestly also revolves around the axis of the crank shaft with crank pin 34.

Normal to its length, the said first sleeve 35 has integrally mounted perpendicularly thereon a second tubular sleeve or slide bearing 36 which reciprocally slides freely upon one end portion of an elongated leverage pitman shaft 37, for translating the rotary motion of the crank to reciprocal motion at the opposite end of the shaft, said pitman shaft 37 having pivot mounting 38 at its opposite end portion to a suitable elongated spring-support member 44 hinged at one end at 45, and exemplified herein as the transversely hinged vertically swingable A-shaped truss frame 44. The pivot 38 is adjacently spaced from said opposite lower end of said shaft 37. The shaft 37 has a stub extention 39 beyond the pivot 38, whereby, upon swinging of the shaft upon the pivot 38, the said lower extension 39, is fulcrummed against a stub handle shaft 41 of a fork 42, the latter being provided with tines or prongs 43 which are successively pressed into the ground and then manipulated laterally in the subsoil 22 by leverage of the shaft extension 39, combined with the forward movement of the apparatus, and then withdrawn from the ground by means and in a manner to be described.

This fork 42 is mounted for destricted pivotal movement on the pivot 38 which is mounted at the vertically swingable apex end of the A-frame 44, the legs of said A-frame extending rearwardly and divergingly from said pivot to a hinged mounting on a transverse axis of its opposite or rearward end on a cross-bar hinge 45, whereby the forward end of the A-frame may swing up and down vertically responsive to the corresponding up and down movement of the slide bearing or sleeve 36 which revolves with the crank pin 34 and reciprocates on pitman shaft 37. At an intermediate upward position on shaft 37 the revolving slide bearing 36 contacts a collar 46, fixedly connected to the upper end of the shaft 37, and raises the shaft 37 and thereby raises the apex or fork-mounting end of the A-frame at pivot 38 which correspondingly raises the fork 42 so that the prongs 43 are clear of the ground soil.

It may be here observed that the fork stub handle 41 and prongs 43 may pivot rearwardly on pin 38 from an axis which is perpendicular to the plane of frame 44, but may not pivot forwardly of such an axis perpendicular to the A-frame because of an elongated lever 47 which is integrally extended angularly rearwardly from the adjacent end of the fork stub 41 and biased by coil spring 48 to normally maintain the fork perpendicular to the plane of the A-frame, said lever being adapted to strike a contact member 49 in the A-frame when the fork is axially perpendicular to the plane of said A-frame. As shown in FIG. 6 the fork may yieldingly pivot rearwardly on pivot 38 by expansion of spring 48 when the fork is pressed rearwardly by the extension 39 of the shaft 37, combined as will be described, with the forward movement of the vehicle when the prongs of the fork are in the ground.

Substantially midway or longitudinally centrally of the A-frame there is a strongly built fixed platform 51 which extends transversely between the divergingly spaced bars of the A-frame and manifestly moves up and down with the corresponding movement of the A-frame. It will also be observed that there is a fixed brace and web supporting plate 52 mounted laterally transversely of the frame and supported between the spaced diagonal upwardly inclined supports 25. The plane of this plate 52 is generally vertical but preferably with a slight incline upwardly and rearwardly. Its lower free edge is spaced from the A-frame so as not to interfere with the pivoted upward and downward movement of the A-frame. Centrally of the plate 52 there is a fixed vertical tubular elongated internally-cylindrical spring casing 53 which axially houses a relatively heavy coil spring 54, that is having sufficient expansive force acting through A-frame 44, to drive the prongs of the fork 42 into reasonably hard ground. The lower end of this spring is preferably fitted in a retaining cup 55 fixed to the platform 51 of the A-frame. The coil spring is aligned by a pin 56 passing axially therethrough, said pin having a loose or wobbly connection at its lower end to the bottom of said cup, as shown in FIGS. 3 and 5, so that the A-frame 44 may move up and down on hinge 45 responsive to pitman 37. The alignment pin 56 has its opposite end passing slidably through a suitable thrust-absorbing bumper block 57 which may be of rubber.

From the foregoing description of structure, it will be observed that when the A-frame 44 is at its lowermost position between and substantially parallel with the lower relatively spaced frame members 23, the coil spring 54 would have been precipitately expanded with great force to the position of the spring shown in FIG. 3 at which position the prongs or tines 43 of the fork 42 would have been thrust into the ground responsive to the impact of the expanding coil spring against the A-frame, bearing in mind that when the prongs are out of the ground and free of pressure by member 39 of the shaft 37, the lever 47 and spring 48 align the fork and prongs substantially vertically or perpendicular relative to the plane of the A-frame and the ground surface, and the prongs are thus thrust into the ground by the relatively violent impact of the coil spring.

At this expanded position of the coil spring 54 and the lowering of the A-frame and penetration of the ground by the fork prongs, the crank pin 34 of the crank has revolved to its lowermost position thereby sliding the sleeve 36 downwardly along the shaft 37 as in FIG. 3. Means are provided by which the A-frame pulls the prongs of the fork from the ground. Starting with the mechanism in the position shown in FIG. 3, the spring 54 is expanded, the A-frame is lowered, the prongs 43 are in the ground and the crank pin 34 has been revolved to its lowermost position. As the crank 29 is further rotated from this lowermost position in direction indicated by the arrow in FIG. 6, and by drive means to be described, the crank webs 32, 33 and pin 34, and combined sleeves 35, 36 move the shaft 37 forwardly on its pivot 38, as also shown in FIG. 6. This forward movement tilts the shaft 37 on its pivot 38 so that the extension 39 presses rearwardly against the stub handle 41 of the fork and thus moves the prongs of the fork laterally rearwardly to break up the soil below the surface of the ground. Such forward revolving movement of the crank and the crank pin 34 lifts the slide bearing sleeve 36 on the shaft 37 until said bearing sleeve 36 abuts the stop member or collar 46 which is fixedly mounted on the upper end of shaft 37. As the crank pin 34 continues to revolve to its maximum upward position, as shown in FIG. 5, it releases the rearward pressure of extension 39 against the fork and simultaneously lifts the shaft 37 and the forward end of frame 44 to which said shaft is pivotally connected, and this upward movement of the frame 44 again compresses spring 54 and also pulls the prongs of the fork out of the ground. In the meantime, responsive to a propelling traction drive means to be described, the machine as an entirety will have moved forward over the ground sufficiently to position the axis of the stub-handle 41 and prongs of the fork at an angle substantially aligned with the axis of the pitman shaft 37, so that, as that shaft is lifted by the further revolving of the crank pin, the prongs are pulled out of the ground from substantially the same holes as they entered the ground and thus the surface of the ground and growth thereon, such as a bed of growing grass, is not torn or substantially hurt by displacement. It may be here stated as an example of operation, though not as a limitation, that it has been found effective and efficient to relatively gear the traction drive with the other mechanism to operate the fork in a ratio so that the fork will be driven into the ground at spaced intervals of about seven inches.

In order to drive the prongs of the fork into relatively hard ground, means are provided for sudden release of the compression of the spring 54 acting in the nature of a cocked spring and trigger release. The spring 54 will have been fully compressed when the crank and its crank pin 34 reach the maximum of the upward excursion as shown in FIG. 5, since that is the maximum of lift of the shaft 37 and the maximum of lift of the elongated hinged support defined as A-frame 44. It will be recalled that the crank shaft 28 at one end of the crank is free-running in bearing 26, and the opposite end of the crank shaft at bearing 27 is mounted in a free-wheeling means such as slip-and-grip clutch generally indicated 31. The clutch 31 may be of any suitable free-wheeling type and has been illustrated as a simple and well-known type in which the crank shaft 28 at bearing 27 has a fixed circumferential collar 59 therearound. This collar is surrounded by a casing 61 which is fixed to and is rotated by the revolving of the adjacent crank web 33. This casing 61 has relatively circumferentially spaced grooves 62, three of which are exemplified. These grooves are tapered in depth and they encase rollers 63 which are spring-biased at 64 to wedge between the bottom of the groove and the outer circumference of collar 59 simultaneously with the upward revolving movement of the crank pin 34, so that there is unison of rotative movement by the crankshaft 28 and the crank hanger pin 34, whereby the crank pin 34 moves to its maximum upward position, which it will be recalled raises the shaft 37 and thereby the fork 42 and A-frame 44 as well as bringing spring 54 to its maximum compression. At said maximum upward position the axis of the fork is substantially vertical responsive to spring 48 and the vertical positioning of shaft 37, whereupon the slip-and-grip over-running or free-wheeling clutch releases its hold on the crank shaft collar 59. Thus the crank is permitted to revolve or run free of restraint, whereupon the compressed spring 54, being released from compression, suddenly and precipitately expands with sufficient force against the A-frame 44 to drive the prongs of the fork into the ground. The clutch is, therefore, a means for selective unison rotation of the crank shaft and crank pin and alternatively free revolution of the crank pin and bearing sleeve 35 independently of the rotatively driven end of the crank shaft.

In the meantime, simultaneously with this next-preceding operation, the whole apparatus is moving forward on the ground responsive to a propelling drive means, and the clutch 31 has again engaged the crank shaft at approximately the maximum lower position of the crank pin 34 and its web, at which position the sliding sleeve 36 has slid down to substantially midway of the pitman shaft 37 and pulled the upper end of that shaft 37 at an incline rearwardly, which manifestly causes it to hinge rearwardly on its fulcrum pivot 38, whereupon the extension 39 on the opposite side of the pivot is spaced from the fork as in FIG. 3.

Bearing in mind that the apparatus is progressively propelled forward, it should be manifest that the prongs of the fork should not be pushed forwardly while imbedded in the hard ground, for several reasons: it would require too much propelling power, it would put too much of a pressure strain on the prongs since the device is intended for use in hard ground, and such movement forwardly, while the prongs were in the ground, would tear relatively large holes in the surface soil or grass. Therefore, as the apparatus moves forward the prongs of the fork are moved on pivot 38 to incline rearwardly against the tension of spring 48, by the two factors of the forward movement of the apparatus and the mechanical means of tilting the upper end of pitman shaft 37 forwardly responsive to rotation of the crank shaft, such as shown in FIG. 6 whereby the extension 39 of shaft 37 has rearward pressure contact with the fork. This causes the prongs of the fork to move laterally in the ground as though hinged at the point indicated "X" in FIG. 3 at the surface of the ground, and thus to tilt from an axially vertical position to a position inclined from front to rear, such inclined tilting being effective firstly to break the subsoil below the surface without disturbing the surface, and secondly, inclining the prongs commensurate with the forward movement of the apparatus so that upon the next successive upward movement of the crank pin and shaft 37 to pull the prong out of the ground, the angle of pull will be along the axis line of the prongs and they will be pulled from the ground out of substantially the same holes as the penetration of the prongs into the ground, after loosening the subsoil below the surface.

As previously stated, the apparatus is a vehicle having four supporting traction wheels, the rear wheels 68 being free running, and front wheels 69 being drive propelling wheels. The apparatus may be manually propelled along the ground surface, but it is preferred that it be motor propelled by any suitable internal combustion engine indicated 71, having a suitable drive which is shown herein as a V-belt drive 72, extending to a V-pulley drive wheel 73. This pulley drive wheel 73 though apparently mounted on one end of the crank shaft 26, runs entirely free on that shaft and has no rotative operative connection therewith. Any kind of a clutch may be employed to drive this pulley wheel or to control power from the pulley wheel to operative and propelling means for the apparatus. It has been found efficient merely to have the V-belt 72 loosely slidable relative to the drive wheel 73 when a neutral non-running condition is desired, and provide a hand lever 74 manually operable from the hand grip of guiding handle 75 to engage and tighten the pulley belt for rotating the pulley drive wheel 73.

The pulley drive wheel 73 fixedly mounts at its hub for simultaneous rotation a sprocket or pinion gear 76 that drives a chain 77 to rotate a gear 78, which in turn rotates a transverse shaft 79 which extends to the opposite side of the apparatus, where it mounts and rotates a drive sprocket gear 81. The drive sprocket gear 81, rotating clockwise, drives a chain 82 that rotates a sprocket gear 83 in clockwise direction for rotation of the previously mentioned crankshaft in bearing 27, being the end of the crankshaft which mounts the slip-and-grip free-wheeling clutch 31.

This drive sprocket gear 81 may also be employed as a drive source for propelling the apparatus over the ground in the following manner: Between the sprockets 81 and 83, the lower flight of the chain 82 engages a separate sprocket gear 84 in a manner to rotate said sprocket 84 counterclockwise which thereby reverses the rotative direction of drive. This drive-reversing sprocket is mounted fixedly on a transverse rotatable drive shaft 85 which is thus rotated counterclockwise at opposite sides of the apparatus. This shaft 85 has mounted thereon at each of its opposite ends for unison counterclockwise rotation reducing drive gears 86 which drive chains 87 and thereby propel the front wheel 69 by engagement of suitable sprocket gears 88 mounted to such front wheel, thus propelling the apparatus forwardly over the ground surface. Such a drive means leaves the rear wheels 69 freely rotatable. If it is desired to move the apparatus rearwardly or even to move the apparatus forwardly without general operation of the mechanism of the apparatus, this may be accomplished by merely lifting the front wheels from contact with the ground by manually overbalancing the apparatus on the freely rotatable rear wheels by pressure on the elongated handle bars 75. This normally suffices for necessary turning of direction of operation or skipping from place to place on a single job. However, since the rear wheels are freely rotatable the apparatus may be towed by any automobile vehicle by merely elevating the front end and front wheels which may be attached to the towing vehicle.

It appears manifest that a critical part of the apparatus which needs protection from damage is the pronged fork 42. Means are therefore provided to protect the fork so that its prongs 43 will not be damaged when not serving their intended operational purpose of penetration into the ground. For this purpose a cradle frame 89 is provided comprising a pair of upstanding relatively spaced bars having their lower ends hingedly mounted at the forward end of the supporting frame 23, each of said upstanding bars of the cradle frame having a cradle bracket 92 in which the crank pin 34 may be received and held and thereby maintain the prongs at an upraised position, the said cradle frame being manipulated between a rearward operational position for holding said crank pin and alternatively to a forward neutral position free of the revolving crank pin, by means of a push rod 93 and a manipulating lever handle 94 adjacent the guiding handle bars 75.

The operation of the parts of the apparatus has been explained in connection with description of such parts. It may be added that by changing ratio of gearing the operation of the apparatus in travel over the ground may be adjusted. As previously stated, it has been demonstrated to be efficient for operative purposes if the speed of travel of the machine over the ground is adjusted so that there will be a penetration of the fork prongs into the ground at approximately 7 inch intervals which may be modified by character of soil and the degree of friability to be achieved.

Having described the invention, what is claimed as new and patentable is

1. A device for cultivating ground soil including vehicular wheels and a supporting frame mounted thereon, an elongated spring-supporting member having one end portion hingedly mounted to a lower portion of the frame on a transverse axis whereby its opposite end may have vertical hinged movement about said transverse axis, a pronged fork member adapted for penetration of the ground, and being pivotally mounted at the opposite end portion of said hingedly mounted support member, a compression spring carried by the frame and having one end footed on the frame for compression and having its opposite expansive end bearing against said hinged support member, centrally between said transverse hinge and pivotal mounting of said fork whereby upon expansion of the spring the prongs of the fork may be driven into the ground, a rotatably driven crank shaft which has a web hanger supporting a crank pin that is revolved in spaced relation about the axis of the crank shaft, means for rotating the crank shaft, a slip-and-grip clutch rotated by the crank shaft, said clutch having gripping engagement to rotate upwardly with the crank shaft for raising the spring-support member and thereby compressing the spring, and being free-running downwardly for expansion of said spring, a sliding sleeve means mounted on the crank pin to revolve therewith a vertically disposed pitman shaft having its upper portion mounted axially slidable through said sliding sleeve means, said pitman shaft being pivotally connected at its opposite lower end to said fork-mounting end portion of said hinged support member, said pitman shaft having a stop member at its opposite upper end adapted for contact by said sliding sleeve means at the upward excursion of the crank pin, whereby the maximum upward movement of the crank pin moves the sliding sleeve member upward along the pitman shaft for engagement of said stop member and thereby raising said pitman shaft therewith whereby the prongs of the fork are simultaneously raised for pulling them out of the ground.

2. A soil loosening device as set forth in claim 1 and in which said hinged elongated spring-supporting member is spring biased to downward position by the expansion pressure of the compression spring simultaneously with the effective release of the free slipping portion of the clutch for driving the fork into the ground.

3. Means for loosening subsurface soil as set forth in claim 1, the said pivotally mounted pronged fork having its prongs yieldably spring biased to an axis perpendicular to the plane of said hingedly mounted support member and said pitman shaft having a portion extended beyond its pivotal mounting to the support member and adapted to bear against the fork to move it rearwardly against the tension of the spring.

4. A device for cultivating soil as set forth in claim 1, the said clutch having means for selectively engaging and disengaging with the hanger web and crank pin for selective rotation of the web and crank pin in unison with, and alternatively in free disengagement from, the rotatable crank shaft.

5. In a device for cultivating soil as set forth in claim 1, and which includes propelling drive means for the vehicular wheels, said drive means being synchronized with revolutions of the crank shaft at a speed ratio whereby the apparatus moves forward over the ground at a speed which inclines the prongs of the pivotally-mounted fork while they remain in the ground to align them in the direction of the upward pull of said pitman shaft on the pivot of the pronged fork, and whereby said pitman shaft may move the prongs of the fork out of the ground from substantially the same holes at which the prongs were pressed into the ground.

6. A soil loosening device comprising a supporting frame having driven vehicular wheels, an elongated spring-supporting member having one end portion mounted hingedly to the frame on an axis transversely of the frame whereby its opposite end may swing vertically, a pronged fork member pivotally mounted at said opposite end portion of said hingedly mounted support and yieldably spring-biased perpendicularly to the plane of the spring-supporting member, a compression spring carried by the frame and having one end footed for compression and having its opposite expansive end bearing against a central portion of said spring-supporting member, means for compressing said spring, a rotatable crank shaft driven in synchronism with the vehicular wheels, means for rotating the crank shaft, a web-supported crank pin which revolves in spaced relation about the axis of the crank shaft, a slip-and-grip clutch mounted on the crank shaft having means for selectively engaging and disengaging with the hanger web and crank pin for rotation of the web and crank pin in unison with, and alternately in free disengagement from, the rotatable crank shaft, a first bearing sleeve rotatably mounted coaxially on said crank pin, a second sleeve fixedly mounted normal to said first sleeve and revolving with said first sleeve on the crank pin, a vertically disposed pitman shaft having its upper portion mounted axially slidable through said second sleeve, said pitman shaft being pivotally connected at its opposite lower end to the fork-mounting end portion of said hinged support member and having an extended free portion beyond said pivotal connection, said slip-and-grip clutch having means adapted to release its grip on the crank shaft at substantially the highest point of movement of said vertical pitman shaft whereby the compression of said spring may be freely released for forcible expansion against said hinged support member and thereby drive the fork prongs into the ground, and the said clutch having means for re-engaging the crank shaft for rotation in unison when the crank pin is at a lower position of its revolution whereby the pitman shaft is tilted forward on its pivotal mounting and the said extension thereof presses rearwardly against the body of the fork member.

7. Means for loosening subsurface soil as set forth in claim 6, said elongated support member being horizontally disposed and spring-biased to a downward position by expansion of the compression spring, the said pitman shaft having a stop member as its upper end portion adapted for contact by said second sliding sleeve means at the upward excursion of the crank pin whereby the upward movement of the crank pin moves the sliding sleeve member upward along the pitman shaft for engagement of said stop member and thereby raising said pitman shaft and its connected end of said spring-supporting member and simultaneously compresses the spring and pulls the prongs of the fork out of the ground.

8. In a device for cultivating soil as set forth in claim 6 and in which the vehicular wheels have propelling drive means synchronized with revolutions of the crank shaft at a ratio whereby the apparatus moves forward over the ground at a speed which inclines the prongs of the fork while they remain in the ground to align them with the direction of the upward pull of said pitman shaft on the pronged fork whereby the prongs may be pulled out of the ground from substantially the same holes at which the prongs were pressed into the ground.

9. A device for cultivating soil including a supporting frame, a horizontally disposed elongated spring-supporting member having one end portion hingedly mounted to the frame to swing vertically on an axis transversely of the frame, a pronged fork member pivotally mounted at the opposite end portion of said spring support member, a fork-spring yieldably spring-biasing the fork to a position perpendicular to the plane of said hingedly mounted spring-support, a compression spring having one end footed for compression against the frame and having its opposite expansive end bearing against said hinged support member for driving the fork into the ground upon expansion of said compression spring, a rotatable crank shaft, means for rotating the crank shaft, a sliding sleeve which is revolved by said crank shaft about the axis of the crank shaft, a vertically disposed pitman shaft having an upper portion mounted axially slidable through said sliding sleeve, said pitman shaft being pivotally connected at its lower end to the vertically-swinging end portion of said hinged support member, the said pitman shaft having a stop member at its opposite upper end adapted for contact by said sliding sleeve upon the upward excursion of the sleeve means, a slip-and-grip clutch means rotatively driven by said crank shaft engaging and raising said sleeve from lower to an upper position and thereby raising the pitman shaft whereby the fork-mounting end of said hinged support member is raised and said coil spring thereby compressed and the fork prongs simultaneously pulled out of the ground, the said clutch having means for intermittently running rotatively free of the crank shaft whereby the coil spring may precipitately expand against said hinged support member and drive the prongs of the fork into the ground.

10. A soil-loosening device as set forth in claim 9 and which includes vehicular wheels and propelling drive means for said wheels synchronized with revolutions of the crank shaft at a speed ratio whereby the apparatus moves forward over the ground at a speed which inclines the prongs of the fork while they remain in the ground to align them with the direction of the upward pull of said pitman shaft on the pronged fork, and thereby pulling the prongs from the ground from substantially the same holes as the prongs were pressed into the ground.

References Cited by the Examiner
UNITED STATES PATENTS

| 118,950 | 9/71 | Koch | 74—40 |
| 897,846 | 9/08 | Olds | 192—45 |
| 1,368,177 | 2/21 | Magistro | 172—89 |
| 1,374,195 | 4/21 | Furnari | 172—62 |
| 2,223,559 | 12/40 | Fleming | 172—84 X |
| 2,772,858 | 12/56 | Galvez | 172—119 |

FOREIGN PATENTS

| 661,287 | 11/51 | Great Britain. |
| 444,685 | 1/49 | Italy. |

ABRAHAM G. STONE, *Primary Examiner.*